United States Patent [19]

Thorns et al.

[11] 4,312,394
[45] Jan. 26, 1982

[54] POLYURETHANE PNEUMATIC TIRE WITH NEUTRAL AXIS OF SIDEWALLS HAVING INCREASING BENDING RADIUS

[75] Inventors: Joachim Thorns, Seevetal; Klaus Meier, Buxtehude; Klaus Jordan, Mölln, all of Fed. Rep. of Germany

[73] Assignee: Phoenix Aktiengesellschaft, Hamburg, Fed. Rep. of Germany

[21] Appl. No.: 240,633

[22] Filed: Mar. 5, 1981

Related U.S. Application Data

[63] Continuation-in-part of Ser. No. 45,508, Jun. 4, 1979, abandoned.

[30] Foreign Application Priority Data

Aug. 12, 1978 [DE] Fed. Rep. of Germany ....... 2835398

[51] Int. Cl.³ .......................... B60C 9/18; B60C 3/00
[52] U.S. Cl. .......................... 152/353 R; 152/357 A; 152/361 R; 156/110 CL; 156/128 P
[58] Field of Search ........... 152/352 R, 352 A, 353 R, 152/353 GG, 357 A, 361 R, 361 FP, 361 DM, 359, 356, 152; 156/110 CC, 125, 128 P

[56] References Cited

U.S. PATENT DOCUMENTS

4,090,547  5/1978  Schmidt .................... 152/361 R X
4,225,683  9/1980  Timm et al. .................... 525/126

FOREIGN PATENT DOCUMENTS

227989  5/1960  Australia .................... 152/357 A
2201747  8/1972  Fed. Rep. of Germany ... 152/357 A

*Primary Examiner*—Edward C. Kimlin
*Assistant Examiner*—Lois E. Boland
*Attorney, Agent, or Firm*—Allison C. Collard; Thomas M. Galgano

[57] ABSTRACT

A pneumatic tire made of polyurethane elastomers or other moldable material which can be made into an elastic, plastic material by means of a chemical reaction is provided. The tire includes a belt which is mounted beneath the tread surface which essentially consists of threads of a stress carrier, which threads run in the circumferential direction of the stress carrier. Alternatively, the belt is made of a moldable material which can be hardened into an elastic, plastic material having an E-modulus larger than 20,000 N/cm². The tire is characterized by the provision of an increasing bending radius of the neutral axis of the tire sidewall from the tire bead to the edge of the belt.

9 Claims, 2 Drawing Figures

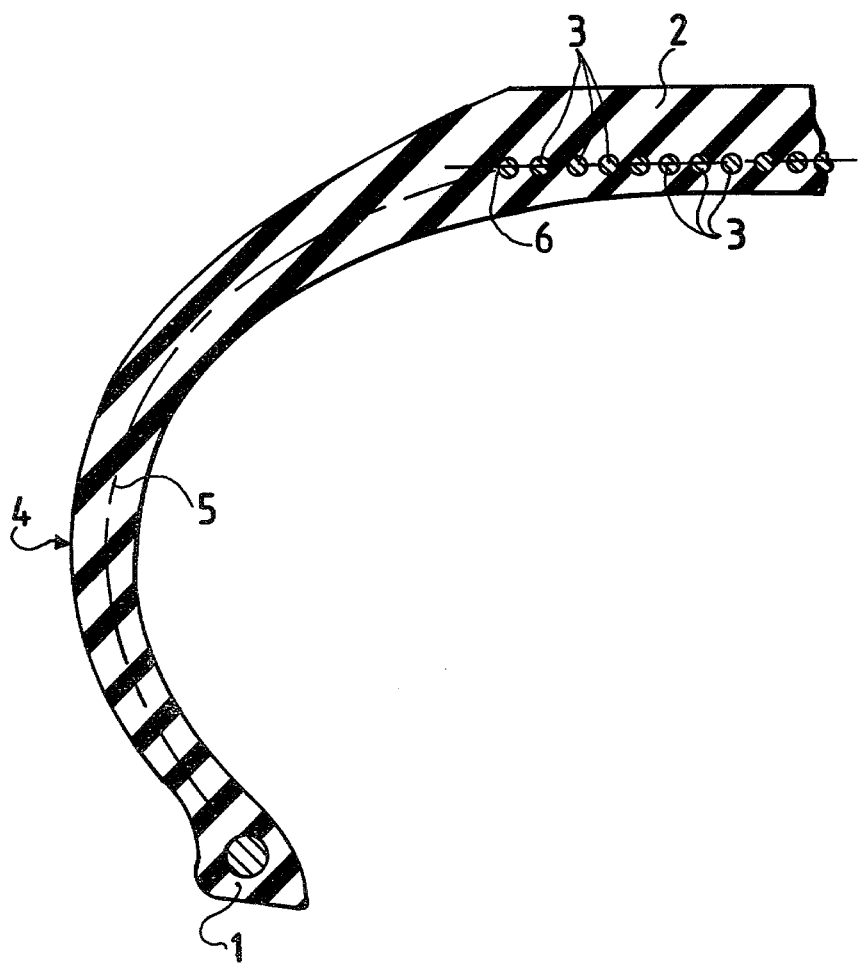

POLYURETHANE PNEUMATIC TIRE WITH NEUTRAL AXIS OF SIDEWALLS HAVING INCREASING BENDING RADIUS

This is a continuation-in-part of application Ser. No. 45,508 filed June 4, 1979, now abandoned.

The present invention relates to a pneumatic tire made of polyurethane elastomers or other moldable material which can be made into an elastic, plastic material by means of a chemical reaction. More particularly, it relates to such a pneumatic tire which has a belt which is mounted beneath the tire crown or tread surface, which essentially consists of threads or fibers of a reinforcement, the threads of which run in a circumferential direction along the reinforcement. Alternatively, the belt is made of a moldable material which can be hardened into an elastic, plastic material having an E-modulus greater than 20,000 N/cm$^2$.

Pneumatic tires of this type are preferable over conventional tires with the same drive characteristics in that they have a lower rolling resistance, lower abrasion and a simplified manufacturing process. In order to maintain the high running or rolling capabilities of such tires in all speed ranges and for long periods of time, it is necessary that these tires be provided with a belt. This belt may consist of threads or fibers of a reinforcement or load bearer wherein the threads run in the circumferential direction of the reinforcement. Alternatively, the belt may be an insert made of a moldable material which can be hardened into an elastic, plastic material having an E-modulus larger than 20,000 N/cm$^2$. The belt material may be reinforced by fibers. Such a tire requires a specific sidewall construction. Consequently, it is desirable by using the advantages of the molding method to make the sidewalls without any additional inserts. Therefore, the sidewalls preferably consist of an isotropic material.

It is therefore an object of the invention to provide a tire of the aforementioned type which has tire sidewalls having excellent fatigue strength.

This fatigue strength is obtained in accordance with the invention in that the sidewall neutral axis or fiber is provided with an increasing bending radius or radius of curvature starting from the tire bead. The increase of the bending radius in the sidewall is gradual and is not subjected to any abrupt changes. Depending on the size of the tire, the bending radius may vary between 25 and 110 mm. Naturally, the larger bending radius is assigned to the larger tire sizes. The difference in the radius of curvature (e.g., $R_2-R_1$), per 5 mm of cross-sectional height of the tire, as measured in an outwardly-directed radial direction starting from the tire bead, decreases in distance from a maximum of about 2 mm down to a minimum of about 0.5 mm (i.e., 2.00 mm $\geq R_2-R_1 \geq R_N-1 \geq 0.5$ mm). In the proximity of the tire crown or tread surface, the bend of the sidewall is less than in the proximity of the bead. This increased bend relates to the inflated, unstressed tire. The effect of the increasing bend may be improved by producing a sidewall of uniform thickness from the bead to the crown. The inventive, constantly changing, bending radius in conjunction with the constant wall thickness results in a stress of the tire sidewalls which is very favorable during the rolling process.

The inventive structure of the tire sidewall is not subjected to bending or shearing stresses in the unstressed condition, but it is merely subjected to the commonly-known tensile forces generated by the air pressure. During operation of the tire, the sidewall is subjected to minimum material stress.

Depending on the tire size, the wall thickness of the tire should be between 5 and 10 mm. This statement concerning the wall thickness depends mainly on the characteristics of the material used. The relatively narrow limit of the wall thickness is given, on the one hand, due to the forces to be absorbed and, on the other hand, due to the heat while the tire is in motion and due to the disadvantageous effect on driving comfort as a result of the squeezing of the tire. The increasing bending radius may be between 25 and 110 mm. This, too, depends on the tire size and the width-height ratio of the tire. Essentially, the sidewall contour shape or profile, as measured along the neutral fiber, runs tangentially into the crown and the cross-sectional line of the belt. The maximum bending radius starts in the proximity of the crown at the edge of the belt insert. Thereby, a relatively continuous stress transition is obtained in the zone of the belt edge.

Other objects and features of the present invention will become apparent from the following detailed description considered in connection with the accompanying drawing which discloses one embodiment of the invention. It is to be understood, however, that the drawing is designed for the purpose of illustration only and not as a definition of the limits of the invention.

BRIEF DESCRIPTION OF DRAWING

In the figures,

FIG. 1 is a fragmentarily-illustrated cross-sectional view of a pneumatic tire embodying the present invention; and FIG. 2 is a graph of a specific example of the invention comparing the distance from the axis of rotation to the axis of rotation.

DETAILED DESCRIPTION OF INVENTION

Referring now in detail to the drawing, therein illustrated is a cross-sectional view through a tire sidewall which extends from a tire bead 1 to a tire crown 2. A steel belt insert 3 is embedded beneath the tread surface which runs at a very small angle with respect to the circumferential direction of the tire. The tire sidewalls 4 (only one of which is shown) have a bending radius which increases over its total height or length from bead 1 to crown 2. The change of the bending line or the change in the bending radius is done gradually. The neutral fiber or axis 5 in belt edge 6 runs tangentially into the cross-sectional line of belt 3. The largest bending radius in the neutral sidewall is located in belt edge 6.

Most desirably, the annular section or zone of the sidewall 4 encompassing the point of maximum width (i.e., about the section adjacent the arrowhead of reference 4) lies in a range which would be equivalent to 0.35 to 0.5 of the cross-sectional height of the tire, as measured from the lower edge of tire bead 1 to the top surface of tire crown 2.

EXAMPLE

A tire body was made of a polyurethane material having the following chemical components:
Polycaprolactone (molecular weight 2,000): 1,000
Diphenylmethane diisocyanate: 425
Butenediol 1,4: 99
Also commonly used additives.

Such a polyurethane mixture and the making of the same are known. Such mixtures are being used for other articles. The tire body which is made from this mixture has an E-modulus of 2,000 N/cm². The wall thickness of this tire is a constant 6 mm.

The tread which is coupled with this tire body has a wall thickness of 8 mm. Between the tread and the tire body, a belt insert is disposed which is made from steel cord wires which runs in a circumferential direction. The essential characteristics of this steel cord belt are contained in patent application Ser. No. 193,979 filed Oct. 6, 1980, the subject matter of which is incorporated herein by reference thereto. The tread of the tire is preferably of the type disclosed in U.S. Pat. No. 4,225,683, the subject matter of which is also incorporated herein by reference thereto.

The manufacturing of the tire is done by casting in a hollow mold, the hollow space of which corresponds to the shape of the finished tire body. The mold can be rotated so that the shaping of the tire is effected by centrifugation.

Before assembly of the individual tire parts in this mold, a belt insert made from cord wire is fixed in its proper position. Thereafter, the reaction mass for the tread is added to the rotating mold. The quantity of the reaction mass is of an amount sufficient to almost reach the proximity of the belt insert made of steel cord. As soon as the reaction mass for the tread has reached a sufficient hardness during the rotation of the mold, the liquid reaction mass for the tire body is added in a second stage. One shoulder cable or bead cord is provided for each shoulder or tire edge, which shoulder cables are evenly sheathed by the reaction mass. As soon as the reaction mass of the second operating stage has sufficiently hardened, the rotation of the mold may be interrupted and the finished tire may be taken from the mold. The tire must be stored at an increased temperature for a few days before use.

Endurance and high-speed tests were performed for such a tire as follows:
Endurance test: at 75 Km/h, air pressure 2.0 bar
  0–300 Km with a load of 3,500 N (100% load)
  300–20,000 Km with 120% load
  20,000–24,000 Km with 130% load
  After this period of running, no damage could be discovered on the tire. Therefore, the test was interrupted, as is the case in all such tests.
High-Speed Test: load 3,320 N, air pressure 2.0 bar
  In intervals of 10 minutes, the speed of the tire on the test stand was increased as follows until the tire was completely demolished:

| 90 Km/h | 190 Km/h |
| --- | --- |
| 130 Km/h | 200 Km/h |
| 160 Km/h | 210 Km/h |
| 170 Km/h | 220 Km/h |
| 180 Km/h | 230 Km/h |

After 4 minutes running at 230 Km/h, the tire was destroyed.

The following chart shows an example of the difference in the radius of curvature for each 5 mm for a tire of the size 185/60-14 (185=width of tire in mm, 60=ratio of tire height relative to tire width and 14=diameter of the rim):

| DISTANCE OF MEASURING POINT FROM AXIS OF ROTATION | LATERAL DISTANCE BETWEEN THE MEASURING POINT AND THE LONGITUDINAL VERTICAL PLANE PASSING IMMEDIATELY ADJACENT TO THE BELT INSERT | RADIUS OF CURVATURE OF THE OUTER WALL AT MEASURING POINT |
| --- | --- | --- |
| 275.0 mm | 0.0 mm | 53.6 mm |
| 270.0 mm | 22.6 mm | 52.8 mm |
| 265.0 mm | 31.1 mm | 52.0 mm |
| 260.0 mm | 37.0 mm | 51.1 mm |
| 255.0 mm | 41.5 mm | 50.3 mm |
| 250.0 mm | 44.9 mm | 49.4 mm |
| 245.0 mm | 47.5 mm | 48.5 mm |
| 240.0 mm | 49.5 mm | 47.6 mm |
| 235.0 mm | 50.8 mm | 46.7 mm |
| 230.0 mm | 51.5 mm | 45.7 mm |
| 225.0 mm | 51.7 mm | 44.7 mm |
| 220.0 mm | 51.4 mm | 43.7 mm |
| 215.0 mm | 50.4 mm | 42.7 mm |
| 210.0 mm | 48.8 mm | 41.6 mm |
| 205.0 mm | 46.5 mm | 40.5 mm |
| 200.0 mm | 43.2 mm | 39.4 mm |
| 195.0 mm | 38.6 mm | 38.3 mm |
| 190.0 mm | 31.7 mm | 37.2 mm |
| 185.0 mm | 8.7 mm | 36.0 mm |
| 180.0 mm | −3.1 mm | 34.9 mm |

As a specific example and as graphically illustrated in FIG. 2, at a distance of 260 mm from the axis of rotation, the distance between the measuring point and the longitudinal plane of the tire is 37.0 mm and the radius of curvature as measured at this point is 51.1 mm.

It should be noted that whether the belt is made from steel cord wire or polyurethane, it is preferable that it has an E-modulus of at least 20,000 N/cm².

It should also be pointed out that the form of the tire sidewall is so designed that the pressurized tire when mounted on the rim is completely free from a bending deformation, the tire sidewall merely being subjected to a tensile stress in the tire sidewall at the concerned point.

Thus, while only one embodiment of the present invention has been shown and described, it will be obvious that many changes and modifications may be made thereunto, without departing from the spirit and scope of the invention.

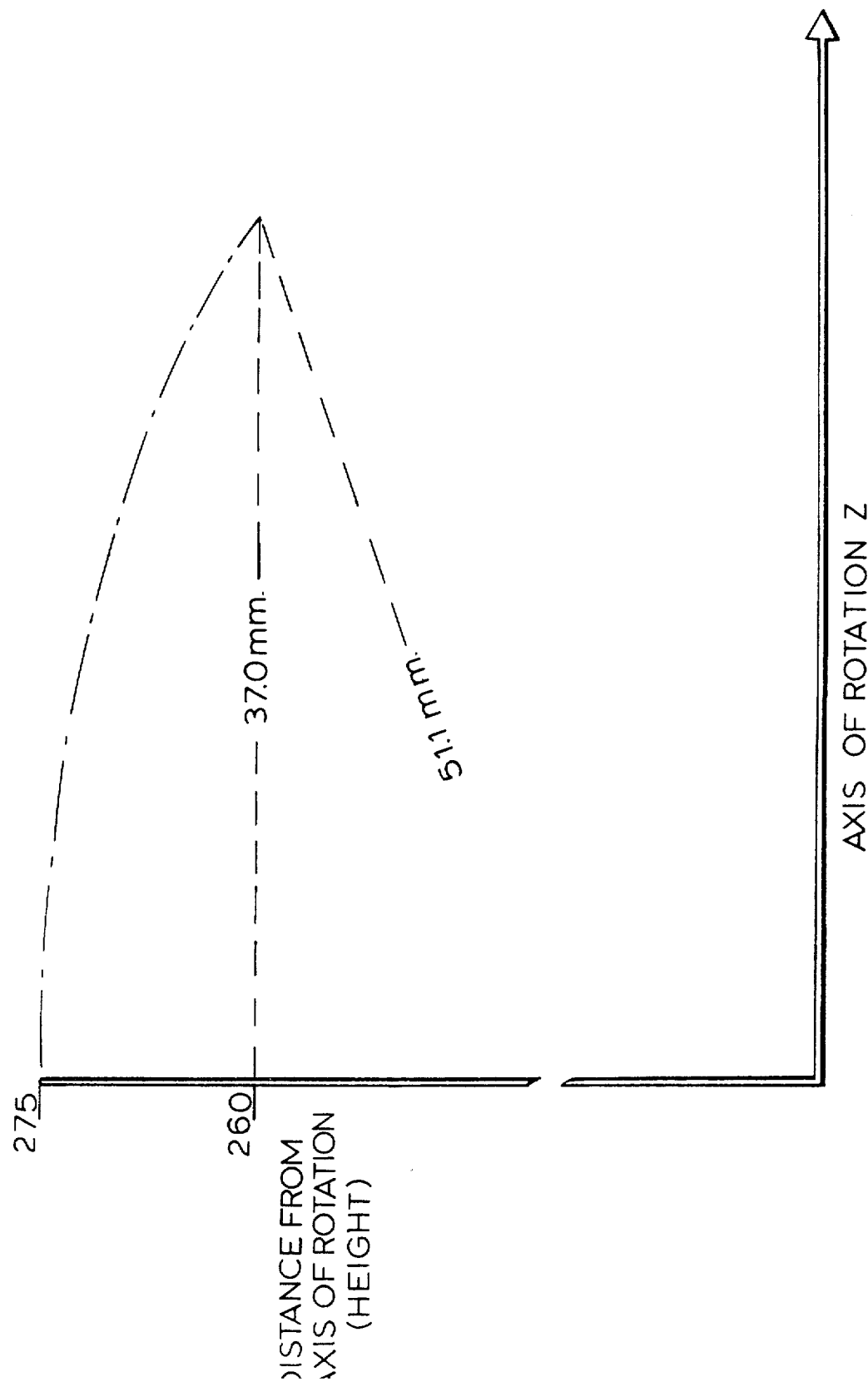

What is claimed is:

1. A pneumatic tire of the type made of a moldable polyurethane elastomer which can be made into an elastic, plastic material by means of a chemical reaction and including a tire crown having a tread surface, a pair of tire beads and a pair of tire sidewalls, the latter of which each extend between and join together said crown and one of said beads, said tire also having a circumferentially-extending belt embedded in said crown beneath said tread surface, thereof, the improvement comprising:
   said tire sidewalls having a substantially uniform wall thickness from said tire beads to said crown, said tire sidewalls also having a neutral axis and a radius of curvature, the latter of which as measured relative to the neutral axis thereof, increases in length in a direction from said bead to an edge of said belt.

2. The pneumatic tire according to claim 1, wherein said belt is composed of threads of a stress carrier which threads run in the circumferential direction of said belt.

3. The pneumatic tire according to claim 1, wherein said belt is made of a moldable material which can be hardened into an elastic, plastic material having an E-modulus greater than 20,000 N/cm$^2$.

4. The pneumatic tire according to claim 1, wherein said radius of curvature lies within the range between 25 and 110 mm.

5. The pneumatic tire according to claim 1, wherein said radius of curvature decreases in length every 5 mm, as measured in an outwardly-directed radial direction, starting from said tire bead and ending adjacent to said tire belt, from 2 mm down to 0.5 mm.

6. The pneumatic tire according to claim 1, wherein said wall thickness of said sidewall is between 5 and 10 mm.

7. The pneumatic tire according to claim 1, wherein said neutral fiber tangentially into a cross-sectional line of said belt.

8. The pneumatic tire according to claim 1, wherein said radius of curvature defines an annular zone of maximum width in said sidewalls which is in the range of about 0.035 to 0.5 times that of the tire cross-sectional height, as measured from the lower edge of the associated tire bead to the top surface of the tire crown.

9. The pneumatic tire according to claim 1, wherein said sidewalls have a constantly and gradually changing radius of curvature.

* * * * *

UNITED STATES PATENT AND TRADEMARK OFFICE
CERTIFICATE OF CORRECTION

PATENT NO. : 4,312,394
DATED : JANUARY 26, 1982
INVENTOR(S) : THORNS ET AL.

It is certified that error appears in the above—identified patent and that said Letters Patent is hereby corrected as shown below:

Please add the sheet containing Fig. 2 to the drawing.
Col. 6, line 5, after "fiber" insert --run--; and line 10, change "0.035" to --0.35--.

Signed and Sealed this

Fourteenth Day of February 1984

[SEAL]

Attest:

GERALD J. MOSSINGHOFF

Attesting Officer     Commissioner of Patents and Trademarks